United States Patent
Tonomura et al.

(10) Patent No.: US 7,790,279 B2
(45) Date of Patent: Sep. 7, 2010

(54) CONSTRUCTIONAL BOARD CAPABLE OF CAPTURING AND DECOMPOSING ALDEHYDE

(75) Inventors: Hiroshi Tonomura, Chita-gun (JP); Toshio Imai, Yokosuka (JP)

(73) Assignee: Nichiha Corporation, Nagoya-shi (JP)

( * ) Notice: Subject to any disclaimer, the term of this patent is extended or adjusted under 35 U.S.C. 154(b) by 254 days.

(21) Appl. No.: 12/007,257

(22) Filed: Jan. 8, 2008

(65) Prior Publication Data

US 2008/0187738 A1 Aug. 7, 2008

(30) Foreign Application Priority Data

Feb. 2, 2007 (JP) .............................. 2007-024495

(51) Int. Cl.
*B32B 13/02* (2006.01)
(52) U.S. Cl. ................. 428/294.7; 428/297.1; 428/212; 427/376.2
(58) Field of Classification Search ............. 428/294.7, 428/297.1, 212; 427/376.2
See application file for complete search history.

(56) References Cited

U.S. PATENT DOCUMENTS 6,143,119 A * 11/2000 Seidner ...................... 156/257
6,410,626 B1 * 6/2002 Wada et al. .................. 524/266
7,084,203 B2 * 8/2006 Shibahara et al. ............ 524/588
7,534,485 B2 * 5/2009 Yamaguchi et al. ...... 428/297.1
2008/0119607 A1 * 5/2008 Shibahara et al. ............ 524/588
2008/0187738 A1 * 8/2008 Tonomura et al. ........ 428/294.7
2008/0245493 A1 * 10/2008 Nishio et al. ................ 162/146
2009/0253865 A1 * 10/2009 Shibutani et al. .............. 525/59

FOREIGN PATENT DOCUMENTS

| JP | 62-1501 A | 1/1987 |
| JP | 2000-356022 A | 12/2000 |
| JP | 2001-187402 A | 7/2001 |
| JP | 2001-323637 A | 11/2001 |
| JP | 2002-127114 A | 5/2002 |
| JP | 2002-212900 A | 7/2002 |
| JP | 2004-74751 A | 3/2004 |
| JP | 2004-331682 A | 11/2004 |
| JP | 2005-28797 A | 2/2005 |
| JP | 2005-95815 A | 4/2005 |
| JP | 2005-111701 A | 4/2005 |
| JP | 2005-213712 A | 8/2005 |
| JP | 2005-271439 A | 10/2005 |

* cited by examiner

*Primary Examiner*—N. Edwards
(74) *Attorney, Agent, or Firm*—Birch, Stewart, Kolasch & Birch, LLP

(57) ABSTRACT

A constructional board has a coat formed on the surface, and is characterized in that carbodihydrazide are included on the surface of the coat and a coat layer containing colloidal silica as a main component is formed.

20 Claims, No Drawings

CONSTRUCTIONAL BOARD CAPABLE OF CAPTURING AND DECOMPOSING ALDEHYDE

FIELD OF THE INVENTION

The present invention relates to constructional boards capable of effectively capturing/decomposing both formaldehyde and acetaldehyde.

DESCRIPTION OF THE RELATED ART

Constructional boards used for an interior material of building have been required to show good performance with respect to capable of effectively capturing/decomposing both formaldehyde and acetaldehyde.

However the constructional boards used as a component in building materials or furniture include an adhesive and a binder which often contains aldehyde such as formaldehyde and acetaldehyde.

The exposure of persons to aldehyde leads to the "Sick House Syndrome".

The Ministry of Land, Infrastructure and Transport Government of Japan reformed the Building Code on Jul. 1st, 2003 in order to address the "Sick House Syndrome".

In the reformed Building Code, the regulated value was set with respect to formaldehyde; however, no regulated value was set with respect to acetaldehyde.

Patent references 1-4 below are related to an interior material and the like capable of adsorbing formaldehyde.

Patent reference 1: JP-A-2004-331682
Patent reference 2: JP-A-2001-323637
Patent reference 3: JP-A-2000-356022
Patent reference 4: JP-A-2002-212900
Patent reference 5: JP-A-2005-095815

A reference cited discloses as follows to give performance formaldehyde is adsorbed and decomposed to constructional boards used for an interior decoration of building.

JP-A-2004-331682 discloses about a method to apply an emulsion having a function to decompose formaldehyde and a aqueous mineral matter paint including colloidal silica, porous inorganic burned product and powdered charcoal to top of constructional boards.

JP-A-2001-323637 discloses about the gypsum board that a material catching formaldehyde was combined with the plaster which is a principal member.

JP-A-2000-356022 discloses about the formaldehyde adsorption fixings which applied paint containing the compound that chemistry adsorbs formaldehyde to the porous materials which can adsorb formaldehyde physically.

JP-A-2002-212900 discloses the fiberboard which has the function that it is adsorbed, and it is caught, and can decompose ammonia and formaldehyde by applying the solution that it is mixed, and zeolite and a hydrazide derivative were dispersed to fiber insulation board.

On the other hand, it attracts attention about an antifouling function. JP-A-2005-095815 discloses an antifouling function.

Super hydrophilicity ability is given to the surface by and silica microparticle is fixed and what is jacketed by the surface, and the silica microparticle absorbs water at the time when water touched the surface, and a dirt bonding to the surface rises, and the antifouling function is the self cleaning function that the dirt runs with water.

In related art:

When an aldehyde capturing agent is mixed with paint, and is applied to substrate, an aldehyde capturing agent is obstructed by the resin which is a chief ingredient of paint, and an ingredient of the aldehyde capturing agent which there is on the coating surface decreases, an effect to catch aldehyde that an aldehyde capturing agent holds is not shown enough.

When an aldehyde capturing agent is mixed with paint, aldehyde gas is caught by merely the surface of the substrate.

Therefore, an effect is not shown unless an aldehyde capturing agent is mixed with paint in large quantities.

When a compound cutting aldehyde in chemical adsorption is applied to porous material, it might do cohesion or denaturation deterioration an aldehyde capturing agent so that drying by application of heat at a temperature from 100 to 150 degrees Celsius is performed with a painting drying step.

And the hydrazines which can catch aldehyde genera catches formaldehyde and it can decompose.

However, as for the hydrazines, it cannot be caught resolution is fail to in acetaldehyde, too.

A constructional board is painted to several levels to give the design, and a product is become.

When paint using an aldehyde capturing agent is used by the top layer which is last painting process, the design is limited by the color of paint and influence of a coating state.

Therefore while being transparent without the painting influencing for the design in last painting process, the painting to have a function capable of effectively capturing and decomposing both aldehyde of acetaldehyde and formaldehyde is expected.

In addition, the constructional board which has an antifouling function is expected.

SUMMARY OF THE INVENTION

The present aspect is a constructional board that has a coated layer on the surface, and a surface coat which is based on colloidal silica including an aldehyde capturing agent is formed on the surface of the coated layer.

The aldehyde capturing agent is carbodihydrazide.

The aldehyde capturing agent catches acetaldehyde and/or formaldehyde.

The constructional board is a fiber reinforced cement board.

The aspect is a method for producing a constructional board which comprises a first step comprising adding a surfactant to a mixed solvent consisting of water and an alcohol and then dispersing therein colloidal silica to give a first process liquid, a second step comprising adding to the first process liquid obtained in the first step an carbodihydrazide to give a second process liquid, a third step comprising applying the second process liquid obtained in the second step to the surface of a constructional board which has preliminarily been coated, and a fourth step comprising drying the constructional board obtained in the third step to form a surface coat.

The process liquid of the aspect is obtained by adding an aldehyde capturing agent to an aqueous dispersion of colloidal silica and thus does not contain a paint or the like which contains a resin as a main component, whereby the aldehyde capturing agent is fixed to fine convexoconcaves on the surface of the colloidal silica without being hindered by the resin and the colloidal silica is fixed to the coat on the substrate via hydrogen bonding.

DESCRIPTION OF THE PREFERRED

The present invention will be explained below in detail.

Substrate

The substrate of the constructional board according to the invention may be a cement board (fiber reinforced cement board) incorporated with a woody reinforcement such as wood flake, woody pulp, wood fiber or pulp, extrusion molded cement board, pulp cement board, gypsum board, calcium silicate board, magnesium carbonate board, cement board, or the like.

On the surface of board made by mineral, there is unevenness and there are a den and a pinhole in a surface part.

A porous aspect and a smooth aspect coexist on the surface.

Quantity of water permeance is usually around 1000-5000 g/m2.

Coating

The surface of the above substrate is subjected to coating, and specifically, multiple-ply coating comprising undercoating, intermediate coating, top coating, and clear coating.

It is desirable to use an aqueous emulsion-type coating composition such as an aqueous acrylic resin emulsion-type coating composition or an aqueous silicone-acrylic resin emulsion-type coating composition for the undercoating, intermediate coating, top coating, and clear coating.

However, it is possible to use a solvent-type coating composition such as acrylic resin solvent-type clear coating composition or a combination of an aqueous emulsion-type coating composition and a solvent-type coating composition.

When the painting is carried out multilayer, as for the surface which is porous comprising a den and a pinhole of substrate surface, it is done filler, and the design is improved.

Amount of coating is influenced by, but quantity of water permeance after the painting becomes around 0-200 g/m2.

Dispersion of Colloidal Silica

The colloidal silica used in the process liquid of the present invention is secondary fine particles which were formed by association of about ten primary fine particles having a particle size of 5 to 10 nm, has fine convexoconcaves formed on the surface, and may contain a slight amount of other components such as aluminum oxide in addition to silicon oxide.

The colloidal silica exhibits hydrophilic property due to OH radicals.

It is believed that the aldehyde capturing agent is adsorbed in and fixed to the gaps formed between the secondary particles.

The colloidal silica may also contain slight amounts of silicon compounds or silicates such as sodium silicate, potassium silicate, and lithium silicate as a binder.

Aldehyde Capturing Agent

A carbodihydrazide as a component of the aldehyde capturing agent is used in the form of aqueous solution. As used herein, the term "aldehyde" includes both formaldehyde and acetaldehyde.

A carbodihydrazide is a compound having a chemical formula represented as NH2NH—CO—NHNH2, which has an amino group (—NH2) at both ends.

A capturing agent (sometimes referred to herein as a deodorizing agent) including only a carbodihydrazide as a capturing component can show sufficient capturing performance (sometimes referred to herein as deodorizing performance) toward both formaldehyde and acetaldehyde.

When organic acid dihydrazide is further added, the capturing performance can be increased.

The organic acid dihydrazide includes at least one of dihydrazide adipate, dihydrazide succinate, dihydrazide sebacate, dihydrazide isophthalate, dihydrazide oxalate, dihydrazide malonate, dihydrazide maleate, and dihydrazide fumarate and dihydrazide malate.

Among those organic acid dihydrazides, both dihydrazide adipate and dihydrazide succinate have good solubility with water.

In the case of singularly using dihydrazide adipate as a component of the deodorizing agent, it is found by HPLC analysis using DNPH method that the odor of formaldehyde is eliminated excellently but the odor of acetaldehyde is not eliminated at all, and that acetaldehyde tends to be released more.

DNPH method is an active sampler of sampling of aldehyde genera and ketones and derivatization use which is filled with spherical silica gel coated with 2.4-Dinitrophenylhydrazine.

Spherical silica gel of a diameter of 120 μm is used for column packing.

It is superior in breathability compared to silica gel of granular type, and it is a cartridge of high collection efficiency and a low blank.

HPLC analysis is high performance liquid chromatography.

However, when carbodihydrazide and dihydrazide adipate are used in combination, deodorizing effect on both formaldehyde and acetaldehyde can be improved.

In combination, if a content of dihydrazide adipate is 10 wt % or more, release of acetaldehyde may be increased depending on the base material used. Therefore, the content of dihydrazide adipate is preferably less than 10 wt % based on the weight of the solution.

In the case of using only a dihydrazide succinate as a component of the deodorizing agent, it is found by HPLC analysis using the DNPH method that the odor of acetaldehyde is eliminated excellently but an odor of formaldehyde is not eliminated at all, and that formaldehyde tends to be released more.

However, when carbodihydrazide and dihydrazide succinate are used in combination, the deodorizing effect on both formaldehyde and acetaldehyde can be improved.

In the combination use, if a content of dihydrazide succinate is 10 wt % or more, the release of acetaldehyde may be increased depending on the base material used.

Therefore, the content of dihydrazide succinate is preferably less than 10 wt % based on the weight of the solution.

The organic acid dihydrazides other than dihydrazide adipate and dihydrazide succinate have low water solubility and are poor in performance of deodorizing acetaldehyde.

In view of above, it is concluded that organic acid dihydrazide to be used in combination with carbodihydrazide is preferably dihydrazide adipate or dihydrazide succinate, and the content thereof is preferably less than 10 wt % based on the weight of the solution.

Further a guanidine salt can be added to carbodihydrazide and/or organic acid dihydrazide to form the capturing agent (deodorizing agent).

The guanidine includes at least one of guanidine hydrochloride, aminoguanidine hydrochloride, aminoguanidine bicarbonate, guanidine sulfamate, guanidine carbonate, guanidine phosphate, and guanidine nitrate.

In the case of using only a guanidine sulfamate, the deodorizing effect on formaldehyde and acetaldehyde is weak.

However, when guanidine sulfamate is used together with carbodihydrazide and dihydrazide adipate or dihydrazide succinate, the deodorizing effect on both formaldehyde and acetaldehyde can be greatly improved.

When a content of guanidine sulfamate becomes 10 wt % or more, a base material may become sticky.

Therefore the content is preferably less than 10 wt % based on the weight of the solution.

In the case of the combined use of a guanidine salt other than guanidine sulfamate, the deodorizing effect with formaldehyde and acetaldehyde may be extremely lowered and a base material may change in surface color or become sticky.

It is preferable to use a guanidine sulfamate in terms of deodorizing performance with aldehyde, particularly with acetaldehyde.

Alcohol

It is preferable to add an alcohol to water as a dispersing medium of the colloidal silica.

It is preferable to use a water-soluble alcohol such as methanol, ethanol or isopropanol.

The alcohol lowers the surface tension of the process liquid of the present invention and increases the affinity an aldehyde capturing agent with an underlying coat, and the wettability of the process liquid can be improved.

Surfactant

It is preferable to add a surfactant as a dispersing agent to a dispersing liquid of the colloidal silica.

As for the surfactant, it is preferable to use any one of an anionic surfactant, a nonionic surfactant and a cationic surfactant.

As for the anionic surfactant, there are for example, at least one of fatty alcohol sulfate (sodium salt or amine salt), alkyl aryl sulfonate (sodium salt or amine salt), alkyl naphthalene sulfonate (sodium salt or amine salt), alkyl naphthalene sulfonate condensate, alkyl phosphate, dialkyl sulfosuccinate, rosin soap, and fatty acid salt (sodium salt or amine salt).

As for the nonionic surfactant, there are for example, at least one of polyoxyethylene alkyl phenol ether, polyoxyethylene alkyl ester, polyoxyethylene alkyl amine, polyoxyethylene alkyl ether, polyoxyethylene alkylolamine, polyoxyethylene alkyl amide, sorbitan alkyl ester, and polyoxyethylene sorbitan alkyl ester.

As for the cationic surfactant, there are for example, at least one of octadecylamine acetate, imidazoline derivative acetate, polyalkylene polyamine derivative or salt thereof, octadecyl trimethylammonium chloride, trimethylaminoethyl alkylamide halogenide, alkyl pyridinium sulfate, and alkyl trimethylammonium halogenide.

A mixture of two or more of surfactants may be used.

The surfactants, as well as the alcohols, decrease the surface tension of the processing liquid of the present invention, favorably disperse the colloidal silica in the processing liquid, and increase the affinity with the underlying coat.

In the second process liquid of the present invention, usually 0.1 to 6.0% by mass of the colloidal silica, 2 to 10% by mass of the alcohol, and 0.01 to 0.5% by mass of the surfactant are included, the balance being water.

If the content of the alcohol is less than 2% by mass, wettability of the aldehyde capturing agent deteriorates, whereas if the content exceeds 10% by mass, volatility of the solvent becomes large to adversely affect coating operation.

If the content of the surfactant is less than 0.01% by mass, the surface tension-lowering effect and colloidal silica-dispersing effect to be brought about by the surfactant become not remarkable, whereas if it is more than 0.5% by mass, the strength, water-resistance, durability and the like of the formed aldehyde capturing agent are adversely affected.

Method of Application of Processing Liquid

After subjecting the surface of the substrate to coating operations to form an underlying layer, an intermediate layer, a top layer, and a clear layer thereon, the resulting coats are heated and dried usually at a temperature from 100 to 150 degrees Celsius in a final drying step.

After the final coat of the clear layer is heated and dried, the substrate is allowed to cool at a normal temperature.

Application of the process liquid is effected when the temperature of the coat lowered to desirably not more than 80 degrees Celsius, more desirably not more than 70 degrees Celsius.

Below the above-mentioned temperature, there is no danger of the heat denaturation of the process liquid.

Usually the process liquid is applied by spray coating, but other well known methods such as flow coater coating and roll coater coating are also applicable.

Although the amount of the process liquid used for coating is not particularly restricted, thy amount is usually such amount that the thickness of the layer of the process liquid obtained by applying the process liquid and drying becomes approximately 30 to 80 nm.

In the process liquid, the colloidal silica is in the form of secondary fine particles in which several primary fine particles are associated and aggregated as mentioned above, and thus fine convexoconcaves are formed on the surfaces of the secondary particles.

Accordingly, the aldehyde capturing agent is captured by and adsorbed on the fine convexoconcaves on the surface of the colloidal silica.

It is believed that the colloidal silica which absorbed the aldehyde capturing agent is fixed to the surface of the coat (clear coat) on the substrate via hydrogen bonding.

The present invention will be explained below by way of specific embodiments.

At first, two kinds of solutions (A) and (B) which constitute a first process liquid and a second process liquid, respectively, are prepared.

(A) Aqueous Dispersion of Colloidal Silica.
- 4% by mass of colloidal silica (particle diameter of secondary particle: 50-100 nm)
- 4% by mass of ethanol
- 0.25% by mass of surfactant (polyoxyethylene alkyl phenol ether)
- 91.75% by mass of water (B) Carbodihydrazide Liquid
- 15% by mass of carbodihydrazide
- 85% by mass of water Carbodihydrazide liquid (B) are mixed in Aqueous dispersion of colloidal silica (A), and it is assumed process liquid.

The mixing ratio was changed in embodiment.

Example 1

A pulp reinforced slag cement perlite board of 12 mm in thickness was sourced from Nichiha Corporation under the brand name Moen siding.

The board was subjected to under coating, intermediate coating and top coating with an aqueous acrylic resin emulsion-type paint, and clear coating with an acrylic resin solution-type paint, and was heat-dried in a heating furnace at 100 to 110 degrees Celsius for 20 minutes.

After the heat-drying, the coated substrate was removed from the heating furnace, and allowed to cool at room temperature.

When the surface temperature of the clear coat lowered to 65 degrees Celsius, the process liquid was applied by spray-coating, and then the coated substrate was allowed to stand at a normal temperature to dry the coat of the process liquid by the remaining heat of the clear coat, thereby forming a covering layer containing the aldehyde capturing agent of 50 nm thick.

Herein, a mixture of the aqueous dispersion of colloidal silica (A) and the carbodihydrazide liquid (B) in a ratio of 100:1 (dispersion) was applied in an amount of 40 g/m2.

Example 2

Except that a mixture of the aqueous dispersion of colloidal silica (A) and the carbodihydrazide liquid (B) in a ratio of 100:5 (dispersion) was applied, the procedure of Example 1 was repeated.

Example 3

Except that a mixture of the aqueous dispersion of colloidal silica (A) and the carbodihydrazide liquid (B) in a ratio of 100:10 (dispersion) was applied, the procedure of Example 1 was repeated.

Example 4

Replacing with carbodihydrazide 15% by mass, carbodihydrazide liquid (B) which mixed carbodihydrazide 5% by mass, dihydrazide adipate 5% by mass, guanidine sulfamate 5% by mass and a leftover with water was made.

Using the carbodihydrazide liquid (B), process liquid mixed at the rate of 100:10 was made aqueous dispersion of colloidal silica (A) and carbodihydrazide liquid (B).

The processing except the above took place same as example 1.

Comparative Example 1

The above-mentioned coated substrate in which the process liquid was not applied, i.e. a coated pulp reinforced slag cement perlite board of 12 mm in thickness which had been subjected to usual coating, was used as a board of Comparative Example 1.

Comparative Example 2

The painting constructional board which carbodihydrazide liquid (B) of the carbodihydrazide 15% density was applied to with amount of coating of 40 g/m2 on the surface of the painting substrate is comparative example 2.

About above Examples 1, 2 and 3 and comparative example 1 and 2, an adsorption test and a reemission test of formaldehyde and acetaldehyde are taken, and a provided result is shown to table 1 and table 2.

Test Methods

An adsorption test of aldehyde is carried out by Tedlar∃ bag method.

(1) Gas of the regulation concentration is made, and it is sealed in Tedlar∃ bag of 30 L. (Formaldehyde 40 ppm Acetaldehyde 100 ppm)

(2) A test piece (5*15 cm) which covered up 5 sides except for the surface with aluminum tape falls in Tedlar∃ bag of 5 L and is done stopper.

(3) Gas of made regulation concentration is poured into Tedlar∃ bag of 5 L, and Tedlar∃ bag stands in a state of room temperature.

(4) Whenever decided time passes, the aldehyde gas density in Tedlar∃ bag of 5 L is measured using a gas detecting tube.

A gas detecting tube: The formaldehyde measurement made by GASTEC CORPORATION.

A symptom of reemission of aldehyde (1) The test piece begins to be taken out of Tedlar∃ bag after an adsorption test was finished, and the test piece falls in different Tedlar∃ bag, and is sealed up.

(2) After having poured air in Tedlar∃ bag which a test piece was put, and was sealed up, Tedlar∃ bag stands in a thermostatic chamber set to 50 degrees Celsius.

(3) After the 24 time course, the aldehyde density was measured with a gas detecting tube, and a gas-detecting tube of a kind same as a gas test tube used in an adsorption test was used.

TABLE 1

Test result of formaldehyde

| | Process liquid | | | | | | | | |
|---|---|---|---|---|---|---|---|---|---|
| | Aqueous dispersion of Colloidal silica (A) | Carbodihydrazide liquid (B) | | | | | | | |
| Example 1 | %%%% | CDH 15% | 100:1 | 40.0 | 38.4 | 29.6 | 8.0 | 0.0 | 0.0 | o |
| Example 2 | | CDH 15% | 100:5 | 40.0 | 33.6 | 6.4 | 0.0 | 0.0 | 0.0 | o |
| Example 3 | | CDH 15% | 100:10 | 40.0 | 32.0 | 9.6 | 0.0 | 0.0 | 0.0 | o |
| Example 4 | | CDH 5% ADH 5% SG 5% | 100:10 | 40.0 | 29.8 | 5.8 | 0.0 | 0.0 | 0.0 | o |
| Comparative example 1 | | | | 40.0 | 38.0 | 32.0 | 17.6 | 0.0 | 3.5 | o |
| Comparative example 2 | | CDH 15% | 0:100 | 40.0 | 14.1 | 9.6 | 0.0 | 0.0 | 0.0 | x |

CDH is a carbodihydrazide
ADH is a dihydrazide adipate
SG is a guanidine sulfamate

TABLE 2

Test result of acetaldehyde

| | Process liquid | | | | | | | | | |
|---|---|---|---|---|---|---|---|---|---|---|
| | Aqueous dispersion of Colloidal silica (A) | Carbodihydrazide liquid (B) | | | | | | | | |
| Example 1 | %%%% | CDH 15% | 100:1 | 100.0 | 80.0 | 65.0 | 60.0 | 18.0 | 0.0 | ○ |
| Example 2 | | CDH 15% | 100:5 | 100.0 | 90.0 | 55.0 | 40.0 | 6.0 | 0.0 | ○ |
| Example 3 | | CDH 15% | 100:10 | 100.0 | 90.0 | 50.0 | 40.1 | 0.0 | 0.0 | ○ |
| Example 4 | | CDH 5% ADH 5% SG 5% | 100:10 | 100.0 | 71.0 | 40.0 | 31.6 | 0.0 | 0.0 | ○ |
| Comparative example 1 | | | | 100.0 | 80.0 | 75.0 | 18.0 | 9.0 | 5.0 | ○ |
| Comparative example 2 | | CDH 15% | 0:100 | 100.0 | 90.0 | 65.0 | 50.0 | 0.0 | 0.0 | x |

CDH is a carbodihydrazide
ADH is a dihydrazide adipate
SG is a guanidine sulfamate The following became clear from a test result of table 1 and 2.

Formaldehyde was rapidly caught six hours later, and approximately 100% were caught 24 hours later.

In an examination with a little loading of an aldehyde capturing agent, a capture effect of acetaldehyde is weak.

However, in example 3 that an aldehyde capturing agent was mixed at ratio 10%, as for the acetaldehyde, it was caught 100%.

A test result of comparative example 1 is shown.

The acetaldehyde was caught in the normal painting constructional board which process liquid was not applied to.

It was the reason that acetaldehyde was adsorbed in a den and a pinhole which there was in a part of the cement substrate that the surface was porous physically.

Reemission of acetaldehyde was ensured after it was heated at 50 degrees Celsius.

The test result of comparative example 2 that undiluted solution of carbodihydrazide liquid was applied to was shown.

At the same time as a test piece dried, on the surface of the board cohesion of carbodihydrazide liquid did outbreak and defectiveness occurred in the appearance of a specimen.

Because carbodihydrazide liquid was not adsorbed in substrate, this cause was because carbodihydrazide liquid remained in the surface of coating, and it cohered at the surface.

Table 1 and two test results are shown.

The process conditions that the process liquid that both colloidal silica dispersions and carbodihydrazide liquid were added was used for were good results.

The reason was a capturing effect of acetaldehyde and formaldehyde was good and because the cohesion that the appearance became bad did not occur.

INDUSTRIAL APPLICABILITY

According to the present invention, the durability and performance to catch aldehyde efficiently and antifouling property ability are given to constructional board.

Therefore it is available in industry.

What is claimed is:

1. A constructional board capable of capturing and decomposing formaldehyde and acetaldehyde, comprising:
    the constructional board;
    a coating layer formed on the surface of the constructional board; and
    a surface coating formed on the coating layer, wherein
    the a surface coating comprises colloidal silica and an aldehyde capturing agent.

2. The constructional board according to claim 1, wherein the aldehyde capturing agent comprises carbodihydrazide.

3. The constructional board according to claim 1, wherein the aldehyde capturing agent comprises carbodihydrazide and at least one selected from the group consisting of dihydrazide adipate and dihydrazide succinate.

4. The constructional board according to claim 1, wherein the aldehyde capturing agent comprises carbodihydrazide and dihydrazide adipate.

5. The constructional board according to claim 1, wherein the aldehyde capturing agent comprises carbodihydrazide and dihydrazide succinate.

6. The constructional board according to claim 1, wherein the aldehyde capturing agent comprises carbodihydrazide, dihydrazide adipate and guanidine sulfamate.

7. The constructional board according to claim 1, wherein the aldehyde capturing agent comprises carbodihydrazide, dihydrazide succinate and guanidine sulfamate.

8. The constructional board according to claim 1, wherein the constructional board comprises a fiber reinforced cement board.

9. The constructional board according to claim 2, wherein the constructional board comprises a fiber reinforced cement board.

10. The constructional board according to claim 3, wherein the constructional board comprises a fiber reinforced cement board.

11. The constructional board according to claim 6, wherein the constructional board comprises a fiber reinforced cement board.

12. The constructional board according to claim 7, wherein the constructional board comprises a fiber reinforced cement board.

13. The constructional board according to claim 1, wherein thickness of the surface coating is 30-80 nm.

14. The constructional board according to claim 2, wherein thickness of the surface coating is 30-80 nm.

15. The constructional board according to claim 3, wherein thickness of the surface coating is 30-80 nm.

16. The constructional board according to claim 6, wherein thickness of the surface coating is 30-80 nm.

17. The constructional board according to claim 7, wherein thickness of the surface coating is 30-80 nm.

18. A process for preparing the constructional board according to claim 2, comprising the steps of:
    adding a surfactant to a mixed solvent comprising water and an alcohol, and dispersing therein colloidal silica to obtain a first process liquid;
    adding a carbodihydrazide to the first process liquid to obtain a second process liquid;
    applying the second process liquid on the surface of the constructional board; and
    heating and drying the constructional board.

19. A process for preparing the constructional board according to claim 3, comprising the steps of:
    adding a surfactant to a mixed solvent comprising water and an alcohol, and dispersing therein colloidal silica to obtain a first process liquid;
    adding a carbodihydrazide to the first process liquid to obtain a second process liquid;
    applying the second process liquid on the surface of the constructional board; and
    heating and drying the constructional board.

20. A process for preparing the constructional board according to claim 6, comprising the steps of:
    adding a surfactant to a mixed solvent comprising water and an alcohol, and dispersing therein colloidal silica to obtain a first process liquid;
    adding a carbodihydrazide to the first process liquid to obtain a second process liquid;
    applying the second process liquid on the surface of the constructional board; and
    heating and drying the constructional board.

\* \* \* \* \*